(12) United States Patent
Berrigan et al.

(10) Patent No.: US 9,821,276 B2
(45) Date of Patent: Nov. 21, 2017

(54) NONWOVEN ARTICLE GRAFTED WITH COPOLYMER

(71) Applicant: 3M INNOVATIVE PROPERTIES COMPANY, St. Paul, MN (US)

(72) Inventors: Michael R. Berrigan, Oakdale, MN (US); Jonathan F. Hester, Hudson, WI (US); Clinton P. Waller, Jr., White Bear Lake, MN (US); Douglas E. Weiss, Overland Park, KS (US)

(73) Assignee: 3M Innovative Properties Company, St. Paul, MN (US)

( * ) Notice: Subject to any disclaimer, the term of this patent is extended or adjusted under 35 U.S.C. 154(b) by 460 days.

(21) Appl. No.: 14/396,764

(22) PCT Filed: Feb. 26, 2013

(86) PCT No.: PCT/US2013/027756
§ 371 (c)(1),
(2) Date: Oct. 24, 2014

(87) PCT Pub. No.: WO2013/162695
PCT Pub. Date: Oct. 31, 2013

(65) Prior Publication Data
US 2015/0099413 A1    Apr. 9, 2015

Related U.S. Application Data

(60) Provisional application No. 61/637,299, filed on Apr. 24, 2012.

(51) Int. Cl.
*B01D 67/00*     (2006.01)
*B01D 69/10*     (2006.01)
*D06M 14/28*    (2006.01)
*D06M 14/26*    (2006.01)

(52) U.S. Cl.
CPC ....... *B01D 67/0093* (2013.01); *B01D 67/009* (2013.01); *B01D 69/10* (2013.01); *D06M 14/26* (2013.01); *D06M 14/28* (2013.01); *B01D 2323/36* (2013.01); *B01D 2323/385* (2013.01); *Y10T 442/20* (2015.04); *Y10T 442/291* (2015.04)

(58) Field of Classification Search
None
See application file for complete search history.

(56) References Cited

U.S. PATENT DOCUMENTS

| | | |
|---|---|---|
| 3,849,241 A | 11/1974 | Butin |
| 3,876,738 A | 4/1975 | Marinaccio |
| 4,118,531 A | 10/1978 | Hauser |
| 4,473,474 A | 9/1984 | Ostreicher |
| 4,707,265 A | 11/1987 | Barnes, Jr. |
| 4,923,694 A | 5/1990 | Shih |
| 4,936,934 A | 6/1990 | Buehning |
| 5,006,247 A | 4/1991 | Dennison |
| 6,230,776 B1 | 5/2001 | Choi |
| 6,264,044 B1 | 7/2001 | Meyering |
| 6,413,070 B1 | 7/2002 | Meyering |
| 6,513,666 B2 | 2/2003 | Meyering |
| 6,776,940 B2 | 8/2004 | Meyering |
| RE39,399 E | 11/2006 | Allen |
| 7,374,416 B2 | 5/2008 | Cook |
| 7,533,417 B2 | 5/2009 | Belz |
| 8,328,023 B2 | 12/2012 | Weiss |
| 8,329,034 B2 | 12/2012 | Waller, Jr. |
| 8,356,717 B2 | 1/2013 | Waller, Jr. |
| 8,551,894 B2 | 10/2013 | Seshadri |
| 8,586,338 B2 | 11/2013 | Etzel |
| 8,652,582 B2 | 2/2014 | Bothof |
| 8,906,645 B2 | 12/2014 | Swanson |
| 2008/0038976 A1 | 2/2008 | Berrigan |
| 2010/0075131 A1 | 3/2010 | Etzel |
| 2010/0155323 A1* | 6/2010 | Weiss .......... C08F 255/00 210/321.6 |
| 2010/0209693 A1 | 8/2010 | Hester |
| 2011/0033633 A1 | 2/2011 | Bothof |

FOREIGN PATENT DOCUMENTS

| | | |
|---|---|---|
| JP | 2007-007575 | 1/2007 |
| WO | WO 2009-086347 | 7/2009 |
| WO | WO 2013-025579 | 2/2013 |

OTHER PUBLICATIONS

Davies, "The Separation of Airborne Dust and Particles," Institution of Mechanical Engineers, 1952, vol. 1B, pp. 185-213.
Kavakli, "Preparation of quaternized dimethylaminoethylmethacrylate grafted nonwoven fabric for the removal of phosphate", Radiation Physics and Chemistry, 2010, vol. 79, pp. 233-237.
Kavakli, "Radiation-induced grafting of dimethylaminoethylmethacrylate onto PE/PP nonwoven fabric", Nuclear Instruments and Methods in Physics Research B, 2007, vol. 265, pp. 204-207.
Loecker, "Hydrolysis of Methacrylic Acid-Methyl Methacrylate Copolymers", 1959, Journal of Polymer Science, vol. 40, pp. 203-216.
Smets, "Alkaline Hydrolysis of Methacrylic Acid-Ester Copolymers", Journal of Polymer Science, 1959, vol. 41, pp. 375-380.
International Search Report for PCT International Application No. PCT/US2013/027756, dated Sep. 27, 2013, 4pgs.

\* cited by examiner

*Primary Examiner* — Frank Vineis
(74) *Attorney, Agent, or Firm* — Kent S. Kokko

(57) ABSTRACT

A functionalized nonwoven substrate and methods for preparing the same are described. The functionalized substrates are useful in selectively filtering and removing biological materials, such as biocontaminates, from biological samples.

41 Claims, No Drawings

NONWOVEN ARTICLE GRAFTED WITH COPOLYMER

CROSS REFERENCE TO RELATED APPLICATIONS

This application is a national stage filing under 35 U.S.C. 371 of PCT/US2013/027756, filed Feb. 26, 2013, which claims priority to Provisional Application No. 61/637,299, filed Apr. 24, 2012, the disclosure of which is incorporated by reference in its/their entirety herein.

The present disclosure relates to functionalized nonwoven substrates, and methods for preparing the same. The present disclosure further relates to a filter using the functionalized nonwoven substrate and a method of filtering a fluid. The functionalized substrates are useful in selectively filtering and removing biological materials, such as biocontaminates, from biological samples.

BACKGROUND

Detection, quantification, isolation and purification of target biomaterials, such as viruses and biomacromolecules (including constituents or products of living cells, for example, proteins, carbohydrates, lipids, and nucleic acids) have long been objectives of investigators. Detection and quantification are important diagnostically, for example, as indicators of various physiological conditions such as diseases. Isolation and purification of biomacromolecules, such as monoclonal antibodies produced from cell cultures or fermentation processes, are important for therapeutic and in biomedical research. Biomacromolecules such as enzymes have been isolated, purified, and then utilized for the production of sweeteners, antibiotics, and a variety of organic compounds such as ethanol, acetic acid, lysine, aspartic acid, and biologically useful products such as antibodies and steroids.

Chromatographic separation and purification operations can be performed on biological product mixtures, based on the interchange of a solute between a moving phase, which can be a gas or liquid, and a stationary phase. Separation of various solutes of the solution mixture is accomplished because of varying binding interactions of each solute with the stationary phase; stronger binding interactions generally result in longer retention times when subjected to the dissociation or displacement effects of a mobile phase compared to solutes which interact less strongly and, in this fashion, separation and purification can be effected.

Most current capture or purification chromatography is done via conventional column techniques. These techniques have severe bottlenecking issues in downstream purification, as the throughput using chromatography is low. Attempts to alleviate these issues include increasing the diameter of the chromatography column, but this in turn creates challenges due to difficulties of packing the columns effectively and reproducibly. Larger column diameters also increase the occurrence of problematic channeling. Also, in a conventional chromatographic column, the absorption operation is shut down when a breakthrough of the desired product above a specific level is detected. This causes the dynamic or effective capacity of the adsorption media to be significantly less than the overall or static capacity. Furthermore, a selective Protein A column must be protected from unwanted contamination that may plug the column making it difficult to clean or possibly ruining the column for reuse. This reduction in effectiveness has severe economic consequences, given the high cost of some chromatographic resins.

Polymeric resins are widely used for the separation and purification of various target compounds. For example, polymeric resins can be used to purify or separate a target compound based on the presence of an ionic group, based on the size of the target compound, based on a hydrophobic interaction, based on an affinity interaction, or based on the formation of a covalent bond.

There is a need in the art for functionalized membranes that overcome limitations in diffusion and binding, and that may be operated at high throughput and at lower pressure drops. There is a need in the art for polymeric substrates having enhanced affinity for selective removal of biocontaminates, such host cell proteins, cell debris, DNA fragments, viruses and cell debris from biological feed-streams in the production of monoclonal antibodies.

There is further need in the art for functionalized membranes that have low levels of total organic extractables. USP Tests are used to determine the biological reactivity of elastomerics, plastics, and other polymeric materials. These tests are detailed in the general chapters Biological Reactivity Tests, In Vitro and Biological Reactivity Tests, In Vivo in the US Pharmacopeia. The Biological Reactivity Tests, In Vitro are designed to determine the biological reactivity of mammalian cell culture following contact with polymeric materials with direct or indirect patient contact or of specific extracts prepared from the materials under test.

According to the injection and implantation testing requirements specified under Biological Reactivity Tests, In Vivo, plastics and polymers are graded on a scale of Class I to Class VI. To grade a plastic or polymer, extracts of the test material are generated in various media and are injected systematically and intracutaneously into rabbits or mice to evaluate their biocompatibility. An additional level of implantation testing may be performed. Plastics not requiring implantation testing are graded Class I, II, III, or V and those plastics requiring implantation testing are graded Class IV or VI. The USP procedure for each test outlines the "pass" criteria so that it can be said that a particular product sample meets the requirements of the test. One significant concern is the amount of organic compounds that may be extracted from such polymers, described as "total organic carbon" or TOC.

SUMMARY OF THE INVENTION

The present disclosure provides an article comprising a nonwoven substrate and a copolymer grafted thereto comprising cationic nitrogen-containing ligand monomer unit, amide monomer units and "oxy" monomer units", as described more fully herein. In many embodiments the grafted article has a very low level of total organic compounds (TOC) by the test method described herein.

The article may be used as a filter element to purify or separate target materials, such as host cell proteins, DNA fragments, viruses, and cell debris, oligonucleotides or therapeutic proteins such as monoclonal antibodies (MAb), from a fluid mixture, such as those fluids produced by common cell product harvesting techniques. In particular, one or more layers of the article of this disclosure may be used in depth-type filtration applications, each of which layers may have the same, or different average fiber size, void volume, degree of polymer grafting, monomer composition of grafted polymer, porosity, loft, tensile strength and surface area. The functionalized substrate may further be used in combination with conventional filtration elements such as porous or microporous membranes.

This disclosure further provides a method of making the article comprising the steps of providing a nonwoven substrate, exposing the nonwoven substrate to ionizing radiation in an inert atmosphere, and subsequently imbibing the exposed substrate with a solution or suspension comprising grafting monomers to graft polymerize said monomers to the surface of the nonwoven substrate.

As used herein:

"Alkyl" means a linear or branched, cyclic or acyclic, saturated monovalent hydrocarbon having from one to about twelve carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Alkenyl" means a linear unsaturated monovalent hydrocarbon having from two to about twelve carbon atoms or a branched unsaturated hydrocarbon having from three to about twelve carbon atoms.

"Aryl" means a monovalent aromatic, such as phenyl, naphthyl and the like.

"Heteroarylene" refers to a divalent group that is aromatic and heterocyclic. That is, the heteroarylene includes at least one heteroatom in an aromatic ring having 5 or 6 members. Suitable heteroatoms are typically oxy, thio, or amino. The group can have one to five rings that are connected, fused, or a combination thereof. At least one ring is heteroaromatic and any other ring can be aromatic, non-aromatic, heterocyclic, carbocyclic, or a combination thereof. In some embodiments, the heteroarylene has up to 5 rings, up to 4 rings, up to 3 rings, up to 2 rings, or one ring. Examples of heteroarylene groups include, but are not limited to, triazine-diyl, pyridine-diyl, pyrimidine-diyl, pyridazine-diyl, and the like.

"Hydrocarbyl" is inclusive of aryl and alkyl;

"(Hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", "aryl", and "heteroaryl" supra.

"(Hetero)arylene" is inclusive of arylene and heteroarylene.

DETAILED DESCRIPTION

The present disclosure provides a polymer grafted article comprising a nonwoven substrate, a grafted copolymer comprising interpolymerized monomer units of a) a cationic nitrogen-containing ligand monomer selected from quaternary ammonium monomers and guanidinyl monomers, including guanidine and biguanidine-containing monomers; b) an amide monomer, c) an "oxy monomer" comprising epoxy-functional and monoether-functional (meth)acrylates and (meth)acrylamides; and d) optionally a poly(alkylene oxide) monomer.

The polymer functionalized article may be described as a discontinuous, non-crosslinked hydrogel polymer, initiated from free radicals formed on a nonwoven substrate by ionizing radiation and the subsequent graft-polymerization of the monomers in an aqueous solution. As used herein, a "hydrogel" is a water-containing gel; a polymer that is hydrophilic and will absorb water, yet is insoluble in water. The term hydrogel is used regardless of the state of hydration.

The nonwoven substrate is a nonwoven web which may include nonwoven webs manufactured by any of the commonly known processes for producing nonwoven webs. As used herein, the term "nonwoven web" refers to a fabric that has a structure of individual fibers or filaments which are randomly and/or unidirectionally interlaid in a mat-like fashion.

For example, the fibrous nonwoven web can be made by carded, air laid, wet laid, spunlaced, spunbonding, electrospinning or melt-blowing techniques, such as melt-spun or melt-blown, or combinations thereof. Spunbonded fibers are typically small diameter fibers that are formed by extruding molten thermoplastic polymer as filaments from a plurality of fine, usually circular capillaries of a spinneret with the diameter of the extruded fibers being rapidly reduced. Melt-blown fibers are typically formed by extruding the molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to from a web of randomly disbursed meltblown fibers. Any of the non-woven webs may be made from a single type of fiber or two or more fibers that differ in the type of thermoplastic polymer and/or thickness.

Staple fibers may also be present in the web. The presence of staple fibers generally provides a loftier, less dense web than a web of only melt blown microfibers. Preferably, no more than about 20 weight percent staple fibers are present, more preferably no more than about 10 weight percent. Such webs containing staple fiber are disclosed in U.S. Pat. No. 4,118,531 (Hauser).

The nonwoven article may optionally further comprise one or more layers of scrim. For example, either or both major surfaces may each optionally further comprises a scrim layer. The scrim, which is typically a woven or nonwoven reinforcement made from fibers, is included to provide strength to the nonwoven article. Suitable scrim materials include, but are not limited to, nylon, polyester, fiberglass, and the like. The average thickness of the scrim can vary. Typically, the average thickness of the scrim ranges from about 25 to about 100 micrometers, preferably about 25 to about 50 micrometers. The layer of the scrim may optionally be bonded to the nonwoven article. A variety of adhesive materials can be used to bond the scrim to the polymeric material. Alternatively, the scrim may be heat-bonded to the nonwoven. In some embodiments, the scrim layer may be grafted as described for the nonwoven article.

The fibers of the nonwoven substrate typically have an effective fiber diameter of from about 3 to 20 micrometers preferably from about 4 to 10 micrometers, as calculated according to the method set forth in Davies, C. N., "The Separation of Airborne Dust and Particles," Institution of Mechanical Engineers, London, Proceedings 1B, 1952. The nonwoven substrate preferably has a basis weight in the range of about 10 to 400 g/m², more preferably about 60 to 150 g/m². The average thickness of the nonwoven substrate is preferably about 0.1 to 10 mm, more preferably about 0.25 to 5 mm for the non-functionalized, uncalendared substrate. The minimum tensile strength of the nonwoven web is about 4.0 Newtons/cm. It is generally recognized that the tensile strength of nonwovens is lower in the machine direction than in the cross-web direction due to better fiber bonding and entanglement in the latter.

Nonwoven web loft is measured by solidity, a parameter that defines the solids fraction in a volume of web. Lower solidity values are indicative of greater web loft. Useful nonwoven substrates have a solidity of less than 20%, preferably less than 15%. Solidity is a unitless fraction typically represented by α:

$$\alpha = m_f \div \rho_f \times L_{nonwoven}$$

where $m_f$ is the fiber mass per sample surface area, which $\rho_f$ is the fiber density; and $L_{nonwoven}$ is the nonwoven thickness. Solidity is used herein to refer to the nonwoven substrate itself and not to the functionalized nonwoven. When a nonwoven substrate contains mixtures of two or more kinds of fibers, the individual solidities are determined for each kind of fiber using the same $L_{nonwoven}$ and these individual solidities are added together to obtain the web's solidity, α.

The term "average pore size" (also known as average pore diameter) is related to the arithmetic median fiber diameter and web solidity and can be determined by the following formula: where D is the average pore size, $d_f$ is arithmetic median fiber diameter, and α is the web solidity.

$$D = d_f \left\{ \left( \frac{2\alpha}{\pi} \right)^{-1/2} - 1 \right\}$$

As an example, the nonwoven substrate before calendering or grafting preferably has an average pore size of 14 μm calculated from a thickness of 0.34 mm, effective fiber diameter of 4.2 um and solidity of 13%. After calendering the nonwoven web will have a thickness of 0.24 mm and solidity of 18% with an average pore size of 8 μm.

The nonwoven substrate, prior to grafting, preferably has a mean pore size of 1-40 microns, preferably 2-20 microns. Mean pore size may be measured according to ASTM F 316-03 Standard Test Methods for Pore Size Characteristics of Membrane Filters by Bubble Point and Mean Flow Pore Test Method B using Freon TF™ as the test fluid.

Further details on the manufacturing method of nonwoven webs of this invention may be found in Wente, Superfine Thermoplastic Fibers, 48 INDUS. ENG. CHEM. 1342(1956), or in Wente et al., Manufacture Of Superfine Organic Fibers, (Naval Research Laboratories Report No. 4364, 1954). Useful methods of preparing the nonwoven substrates are described in U.S. RE39,399 (Allen), U.S. Pat. No. 3,849,241 (Butin et al.), U.S. Pat. No. 7,374,416 (Cook et al.), U.S. Pat. No. 4,936,934 (Buehning), and U.S. Pat. No. 6,230,776 (Choi).

In some embodiments the nonwoven substrate is calendared using a smooth roll that is nipped against another smooth roll. A calendared or compressed nonwoven web provides for a more uniform substrate and dimensional stability in later washing steps to remove unreacted monomers. Thus, in a preferred embodiment, the nonwoven substrate according to the present invention are thermally calendared with a smooth roll and a solid back-up roll (e.g., a metal, rubber, or cotton cloth covered metal). The nonwoven substrate may be calendered before or after grafting, and may be calendared with or without an additional nonwoven layer, or with or without an additional scrim layer.

In a calendaring step, a pattern may be applied to one or both major surfaces using a pattern roll. The patterned imparted to the nonwoven substrate may be any pattern including, for example, intermittent lines, hexagonal cells, diamond cells, square cells, point bonds, patterned point bonds, crosshatched lines, or any other regular or irregular geometric pattern. In particular, it is desirable to impart point bonds to the fibers of the nonwoven matrix and the optional scrim layer to improve the structural integrity.

Bonding between the fibers of the nonwoven substrate and/or the fibers of an optional scrim layer may be desirable to provide a matrix of desired coherency, making the nonwoven web more easily handled. Bonding fibers themselves means adhering the fibers together firmly, so they generally do not separate when the web is subjected to normal handling. Bonding may be achieved, for example, using thermal bonding, adhesive bonding, powdered adhesive binder, hydroentangling, needlepunching, calendering, or a combination thereof. Conventional bonding techniques using heat and pressure applied in a point-bonding process or by smooth calendar rolls can be used. A useful bonding method is pattern bonding wherein heated calender rolls or ultrasonic bonding equipment are used to bond the fibers together, usually in a localized bond pattern. Another technique for bonding fibers or the nonwoven, or to the optional scrim is disclosed in U.S. Patent Application Publication No. 2008/0038976.

During calendaring, it is desirable to closely control the temperature and the pressure of the smooth rolls. In general, the fibers are thermally fused at the points of contact without imparting undesirable characteristics to the nonwoven substrate such as forming a film or skin on the surface thereof. For example, when using nylon nonwoven substrates, it is preferred to maintain the temperature of the smooth roll between about 40° C. and 100° C., more preferably between about 50° C. and 75° C. In addition, the smooth roll should contact the fibrous web at a pressure of from about 10 kilogram-force/cm to about 50 kilogram-force/cm, more preferably from about 15 kilogram-force/cm to about 30 kilogram-force/cm. The average thickness of the calendared nonwoven substrate is preferably about ⅔ the thickness of the starting nonwoven.

Suitable polyolefins include, but are not limited to, polyethylene, polypropylene, poly(1-butene), copolymers of ethylene and propylene, alpha olefin copolymers (such as copolymers of ethylene or propylene with 1-butene, 1-hexene, 1-octene, and 1-decene), poly(ethylene-co-1-butene), poly(1-methylpentene) and poly(ethylene-co-1-butene-co-1-hexene). Preferably the nonwoven substrate is a polypropylene.

The polymer grafted article comprises a nonwoven substrate, and a grafted copolymer comprising interpolymerized monomer units of a) a cationic nitrogen-containing ligand monomer; b) an amide monomer, and c) an "oxy" monomer. The cationic nitrogen-containing ligand monomer includes quaternary ammonium-containing ligand monomers and guanidinyl-containing ligand monomers. The "oxy" monomer is inclusive of epoxy monomers and $C_3$-$C_{10}$, preferably $C_4$-$C_6$, monoether-containing monomers. More specifically, the grafted copolymer comprises interpolymerized monomer units including a. 10 to 50 parts by weight of the cationic nitrogen-containing ligand monomer;

b. 10 to 80 parts by weight of the amide monomer, and
c. 10 to 40 parts by weight of the oxy monomer; and
  wherein the sum of a to c is 100 parts by weight.

The cationic nitrogen-containing ligand monomer is of the general formula:

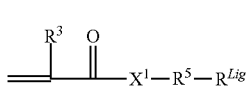

where $X^1$ is —O— or —NR$^3$—, $R^3$ is H or $C_1$-$C_4$ alkyl-; $R^5$ is an (hetero)hydrocarbyl group, preferably a hydrocarbyl group, more preferably a $C_1$-$C_8$ alkylene, and $R^{Lig}$ is a quaternary ammonium ligand group or a guanidinyl-containing ligand group.

In some embodiments the cationic nitrogen-containing ligand monomer is a quaternary ammonium monomer is of the general formula:

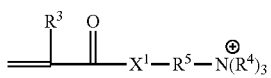

where $X^1$ is —O— or —NR$^3$—, where each $R^3$ is H or $C_1$-$C_4$ alkyl, preferably H or methyl; and $R^5$ is an alkylene (e.g., an alkylene having 1 to 10 carbon atoms, 1 to 6, or 1 to 4 carbon atoms), each $R^4$ is independently hydrogen, alkyl, or aryl.) and may be substituted by a hydroxyl group. The counter ions of the quaternary ammonium salts are often halides, sulfates, phosphates, nitrates, and the like. Such monomers having a quaternary ammonium group preferably may be directly grafted to the surface of the nonwoven substrate (in the presence of the additional co-monomers described herein), or less preferably an aminoalkyl(meth)acryloyl monomer having a primary, secondary or tertiary amine group, may be grafted and subsequently converted by alkylation to a quaternary ammonium group of Formula II.

Useful aminoalkyl(meth)acrylates (i.e., in Formula II is oxy) include trialkylaminoalkyl(meth)acrylates such as, for example, trimethylaminoethylmethacrylate, trimethylaminoethylacrylate, triethylaminoethylmethacylate, triethylaminoethylacrylate, trimethylaminopropylmethacrylate, trimethylaminopropylacrylate, dimethylbutylaminopropylmethacrylate, diethylbutylaminopropylacrylate and the like.

Exemplary amino(meth)acrylamides (i.e., $X^1$ in Formula II is —NR$^3$—) include, for example, 3-(trimethylamino)propylmethacrylamide, 3-(triethylamino)propylmethacrylamide, 3-(ethyldimethylamino)propylmethacrylamide.

Preferred quaternary salts of the aminoalkyl(meth)acryloyl monomers of Formula II include, but are not limited to, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

The grafted copolymer may comprise 10 to 50 parts by weight, preferably 20 to 40 parts by weight, of such quaternary amine monomer units, relative to 100 parts total grafting monomer(s).

In some embodiment the grafted copolymer comprises cationic guanidinyl-containing ligand monomers of the Formula IIIa or b. Such compounds may contain agmatine-containing ligands; guanidine and biguanide containing ligands.

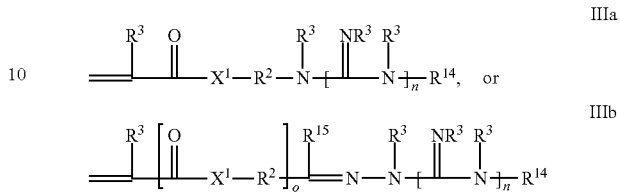

wherein
$R^2$ is a (hetero)hydrocarbyl group, preferably a divalent alkylene having 1 to 10 carbon atoms;
each $R^3$ is independently H or hydrocarbyl, preferably $C_1$-$C_4$ alkyl;
$R^{14}$ is H, $C_1$-$C_4$ alkyl or —N(R$^3$)$_2$;
$R^{15}$ is H or hydrocarbyl, preferably $C_1$-$C_4$ alkyl or aryl;
$X^1$ is —O— or —NR$^3$—,
o is 0 or 1, and
n is 1 or 2.

Such ligand monomers may be made by condensation of an alkenyl or alkenoyl compound, typically a (meth)acryloyl halide, a (meth)acryloylisocyanate, or an alkenylazlactone, with a compound of formulas IVa or IVb:

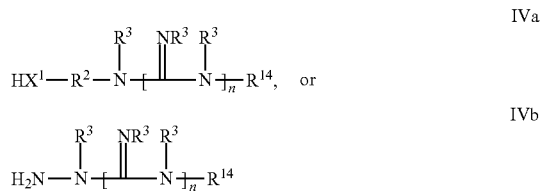

where $X^1$, and $R^2$, $R^3$, $R^{14}$, $R^{15}$, and n are as previously defined.

Other ligand monomers may be made by condensation of a carbonyl containing monomer, such as acrolein, vinylmethylketone, diacetone acrylamide or acetoacetoxyethylmethacrylate, with a compound of formulas IVa or IVb.

The grafted copolymer may comprise 10 to 50 parts by weight, preferably 20 to 40 parts by weight, of such cationic guanidinyl-containing ligand monomers units, relative to 100 parts total grafting monomer(s). The cationic nitrogen-containing ligand monomer may comprise quaternary amine monomer units of Formula II, guanidinyl-containing monomer units of formulas IIIa or b, or a mixture of both such monomer units.

The grafted copolymer further comprises "oxy monomer" units which are inclusive of epoxy functional monomer units and alkyl ether functional monomer units. Desirably, the oxy monomers have an aqueous solubility of 15-25 g/L. Such "oxy monomer" include epoxy-functional and monoether-functional (meth)acrylates and (meth)acrylamides and include those of the general formula:

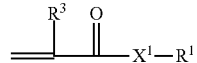

wherein:
$R^3$ is —H or $C_1$-$C_4$ alkyl;
$X^1$ is —$NR^3$— or —O—; and
$R^1$ is an epoxy-functional or ether-functional (hetero)hydrocarbyl group. More particularly the ether functional group is a lower alkyleneoxy alkyl group. Preferably, the $R^1$ group is based on a straight-chain, branched, cyclic or polycyclic hydrocarbon of 2 to 30 carbons having an oxirane (epoxy) group included. More preferably, the $R^8$ group contains 3 to 10 carbons, such as glycidyl methacrylate (GMA).

Some preferred epoxy monomers are of the formula:

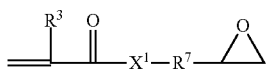
VI wherein:
$R^7$ is a (hetero)hydrocarbyl group, preferably a hydrocarbyl group, more preferably a $C_1$-$C_6$ alkylene;
$R^3$ is —H or $C_1$-$C_4$ alkyl; and
$X^1$ is —$NR^3$— or —O—.

Representative epoxy monomers include glycidyl(meth)acrylate, thioglycidyl(meth)acrylate, 3-(2,3-epoxypropoxy)phenyl(meth)acrylate, 2-[4-(2,3-epoxypropoxyl)phenyl]-2-(4-(meth)acryloyloxy-phenyl)propane, 4-(2,3-epoxypropoxy)cyclohexyl(meth)acrylate, 2,3-epoxycyclohexyl(meth)acrylate, and 3,4-epoxycyclohexyl(meth)acrylate.

In one useful embodiment, the epoxy functional monomer is derived from the reaction of vinyldimethyl azlactone with a hydroxyalkyl epoxy compound as shown in Scheme 1:

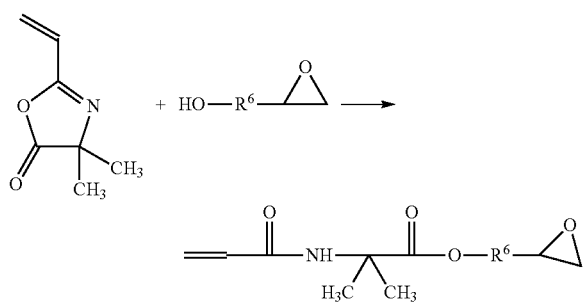

where $R^6$ is a $C_1$-$C_6$ alkylene.

It is believed that the epoxy groups of these monomers in the grafted copolymer hydrolytically ring open to provide terminal, pendent diol groups on the copolymer. Thus the original grafted hydrophobic epoxy group hydrolyzes to provide a hydrophilic diol group to the grafted copolymer.

The "oxy monomers" alternatively may be selected from lower alkyl ether functional monomers. Such ether functional monomers comprise lower monomer ether monomers of the formula:

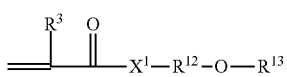
VII where
$R^3$ is —H or $C_1$-$C_4$ alkyl; and
$X^1$ is —$NR^3$— or —O—,
$R^{12}$ is a linear or branched $C_2$-$C_4$ alkylene, and
$R^{13}$ is a linear or branched $C_1$-$C_4$ alkyl. Preferably the sum of the carbon atoms of the $R^{12}$ and $R^{13}$ groups is from 3 to 10, preferably 3 to 6.

The grafted copolymer may comprise 10 to 40 parts by weight, preferably 15 to 35 parts by weight, of such oxy monomer units, relative to 100 parts total grafting monomer(s).

The grafted polymer optionally contains other ethylenically-unsaturated hydrophilic amide monomer units. As used herein these "hydrophilic monomers" are those polymerizable amide monomers having a water miscibility (water in monomer) of at least 1 wt. %, preferably at least 5 weight % without reaching a cloud point. The hydrophilic amide monomer units include (meth)acrylamides and N-vinyl amides are of the general formulas:

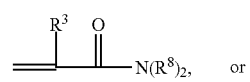
VIIIa

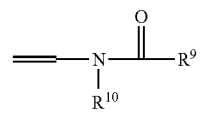
VIIIb where
$R^3$ is —H or $C_1$-$C_4$ alkyl;
Each $R^8$ is an H, an alkyl or an aryl group,
$R^9$ and $R^{10}$ are alkyl groups, or may be taken together to form a 5 or 6-membered ring.

Examples of suitable hydrophilic monomers include N-vinyl caprolactam, N-vinyl acetamide, N-vinyl pyrrolidone, acrylamide, mono- or di-N-alkyl substituted acrylamide, and combinations thereof. Preferred polar monomers include N-vinyl pyrrolidone, N-vinyl acetamide, methylacrylamide, and mixtures thereof.

The grafted copolymer may comprise 10 to 80 parts by weight, preferably 30 to 60 parts by weight, of such amide monomer units, relative to 100 parts total grafting monomer(s).

As the polymer is non-crosslinked, the imbibing solution containing the monomer mixture contains no additional thermal- or free-radical crosslinking agents, e.g no polyethylenically unsaturated monomers.

With regard to the grafting monomers supra, the monomers that are grafted to the surface of the nonwoven substrates usually have either an acrylate or other non-acrylate polymerizable functional group for grafting by e-beam. Methacryloyl groups are preferred for grafting of the monomer to the nonwoven substrate surface (using the process described herein) due to the slower, more uniform reactivity and durability of such methacryloyl monomers to nonwovens that have been exposed to e-beam irradiation.

As described in further detail below, functionalized substrates of the present invention may be prepared using above-described monomers to provide a grafted polymer on the surface of a porous nonwoven base substrate. When the above-described grafting monomers are used, the monomers may be grafted onto the nonwoven base substrate in a single reaction step (i.e., exposure to an ionizing radiation) followed by imbibing with all grafting monomers present or in sequential reaction steps (i.e., a first exposure to ionizing radiation followed by imbibing with one or more grafting monomer, then a second exposure to an ionizing radiation and a second imbibing after the second exposure to the ionizing radiation).

It will be further understood that the grafting process will yield a radical species on the surface of the nonwoven substrate. After imbibing with the monomer solution, polymerization will initiate with the formation of a radical on the monomer that may further polymerize with one of more additional monomers, resulting in a grafted polymers having these groups pendent from the polymer chain as simply illustrated below.

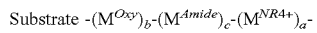
Substrate -$(M^{Oxy})_b$-$(M^{Amide})_c$-$(M^{NR4+})_a$-

In the formula, the -$(M^{NR4+})_w$- represents the residue of the grafted cationic nitrogen-containing monomer of Formulas II and/or III having "a" polymerized monomer units where a is at least 1, the -$(M^{OXY})_b$- represents the residue of the grafted "oxy" monomers of Formulas V, VI and/or VII having "b" polymerized monomer units, where b is at least one, and -$(M^{Amide})_c$- represents the residue of the grafted amide monomers of Formulas VIII having "c" polymerized monomer units, where c is at least one. Subscripts a to c may alternatively represent the parts by weight of each monomer unit described supra. The monomers are shown in an arbitrary arrangement.

As previously described, it is believed that the epoxy groups of the epoxy-functional "oxo monomers" hydrolyze post-grafting to diol groups. In such embodiments, the grafted polymers are illustrated as follows:

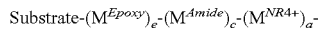
Substrate-$(M^{Epoxy})_e$-$(M^{Amide})_c$-$(M^{NR4+})_a$-

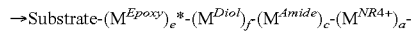
→Substrate-$(M^{Epoxy})_e*$-$(M^{Diol})_f$-$(M^{Amide})_c$-$(M^{NR4+})_a$-

In the scheme, the -$(M^{NR4+})_w$- represents the residue of the grafted cationic amine monomer of Formulas II or III having "a" polymerized monomer units where a is at least 1, -$(M^{Amide})_c$- represents the residue of the grafted amide monomers having "c" polymerized monomer units, where c is at least one; the -$(M^{Epoxy})_e$- represents the residue of the grafted epoxy-functional "oxy monomers" having "e" polymerized monomer units, where e is at least one. After hydrolysis the grafted copolymer may have "e*" polymerized epoxy-functional monomer units and "f" pendent diol groups as result of the hydrolysis. All or a portion of the original epoxy-function monomer units may be hydrolyzed. Thus subscript e* may be zero, or a fraction of the original subscript "e". Subscript "f" is non-zero and may be equal to the original subscript "e". The copolymer may be random or block. Subscripts a, e*, c and f may alternatively represent the parts by weight of each monomer unit described supra. The monomers are shown in an arbitrary arrangement.

The process of preparing the grafted nonwoven substrate comprises the steps of providing a nonwoven substrate, exposing the nonwoven substrate to e-beam radiation in an inert atmosphere, and subsequently imbibing the exposed substrate with a solution or suspension comprising the grafting monomers to graft polymerize said monomers to the surface of the nonwoven substrate.

In the first step the nonwoven substrate is exposed to ionizing radiation, such as E-beam radiation, in an inert atmosphere. Generally, the substrate is placed in a chamber purged of oxygen. Typically, the chamber comprises an inert atmosphere such as nitrogen, carbon dioxide, helium, argon, etc. with a minimal amount of oxygen (less than 100 ppm), which is known to inhibit free-radical polymerization. Desirably, the surface of the imbibing vessel is inert to the ionizing radiation.

The irradiation step comprises the ionizing irradiation of nonwoven substrate surfaces, preferably with ionizing e-beam or gamma radiation to prepare free radical reaction sites on such surfaces upon which the monomers are subsequently grafted. "Ionizing irradiation" means radiation of a sufficient dosage and energy to cause the formation of free radical reaction sites on the surface(s) of the base substrate. Ionizing radiation may include gamma, electron-beam, x-ray and other forms of electromagnetic radiation. In some instances, corona radiation can be sufficiently high energy radiation. The radiation is sufficiently high energy, that when absorbed by the surfaces of the base substrate, sufficient energy is transferred to that support to result in the cleavage of chemical bonds in that support and the resultant formation of free radical sites on the nonwoven substrate. One or more layers of nonwoven substrates may be subjected to the ionizing radiation.

High energy radiation dosages are measured in kilograys (kGy). Doses can be administered in a single dose of the desired level or in multiple doses which accumulate to the desired level. Dosages can range cumulatively from about 1 kGy to about 200 kGy. The dose can be delivered all at once such as from an E-beam source or accumulated from a slow dose rate over several hours such as dosage delivered from a gamma source. The total dose received by the substrate depends on a number of parameters including source activity, residence time (i.e. the total time the sample is irradiated), the distance from the source, and attenuation by the intervening cross-section of materials between the source and sample. Dose is typically regulated by controlling residence time, distance to the source, or both.

Generally, it was found that doses in the range of about 40 to 70 kGy were suitable for generating the grafted hydrogel polymer. Total dose requirement for any given composition will vary as a function of desired grafting objectives, monomer selected, substrate used and the dose rate. Thus, a dose rate can be selected based on desired properties for a specified composition. The dose rate is typically in the range of 0.0005 kGy/sec (gamma) to 200 kGy/sec (E-beam).

Electron beam is one preferred method of grafting due to the ready-availability of commercial sources. Electron beam generators are commercially available from a variety of sources, including the ESI "ELECTROCURE" EB SYSTEM from Energy Sciences, Inc. (Wilmington, Mass.), and the BROADBEAM EB PROCESSOR from PCT Engineered Systems, LLC (Davenport, Iowa). For any given piece of equipment and irradiation sample location, the dosage delivered can be measured in accordance with ASTM/ISO 5127S entitled "Practice for Use of a Radiochromic Film Dosimetry System." By altering extractor grid voltage, and/or distance to the source, various dose requirements can be obtained.

Other sources of irradiation may be used with equal grafting performance; a desirable source of ionizing radiation comprises an electron beam source because the electron beam can produce high and fast dose delivery rates. Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 100 to 300 kilo-electron volts (keV), pass out of the vacuum chamber through the foil window and penetrate whatever material is positioned immediately beyond the foil window.

The quantity of electrons generated is directly related to the current. As extractor grid voltage is increased, the acceleration or speed of electrons drawn from the tungsten wire filaments increase. E-beam processing can be extremely precise when under computer control, such that an exact dose and dose rate of electrons can be directed against the nonwoven substrate.

The temperature within the chamber is desirably maintained at an ambient temperature by conventional means. Without intending to be limited to any particular mechanism, it is believed that the exposure of the nonwoven substrate to an electron beam results in free radical sites on the substrate surface which can then subsequently react with the grafting monomers in the imbibing step.

The total dose received by nonwoven substrate primarily affects the number of radical sites formed on the surface thereof and subsequently the extent to which the grafting monomers are grafted onto the nonwoven substrate. Dose is dependent upon a number of processing parameters, including voltage, web- or line-speed and beam current. Dose can be conveniently regulated by controlling line speed (i.e., the speed with which the nonwoven substrate passes under the irradiation device), and the current supplied to the extractor grid. A target dose (e.g., <10 kGy) can be conveniently calculated by multiplying an experimentally measured coefficient (a machine constant) by the beam current and dividing by the web speed to determine the exposure. The machine constant varies as a function of beam voltage.

While the controlled amount of electron beam radiation exposure is dependent upon the residence time, the nonwoven substrate is subjected to a controlled amount of dosage ranging from a minimum dosage of about 1 kilogray (kGy) to a practical maximum dosage of less than about 200 kGy, depending on the particular polymer. Generally, suitable gamma ray sources emit gamma rays having energies of 400 keV or greater. Typically, suitable gamma ray sources emit gamma rays having energies in the range of 500 keV to 5 MeV. Examples of suitable gamma ray sources include cobalt-60 isotope (which emits photons with energies of approximately 1.17 and 1.33 MeV in nearly equal proportions) and cesium-137 isotope (which emits photons with energies of approximately 0.662 MeV). The distance from the source can be fixed or made variable by changing the position of the target or the source. The flux of gamma rays emitted from the source generally decays with the square of the distance from the source and duration of time as governed by the half-life of the isotope.

In the instant method, the irradiated substrate, having free radical sites on the surface of the nonwoven substrate, are imbibed with the aqueous monomer solution or suspension subsequent to and not concurrent with, the irradiation step. The free radical sites generated on the surface of the nonwoven substrate have average lifetimes ranging from several minutes to several hours and progressively decay to a low concentration within about ten hours at room temperature. Lower temperatures, such as dry ice temperatures, promotes longer radical lifetimes. The effective binding absorption capacity of the grafted nonwoven from the graft polymerization process is little changed after a reaction time of about 12 hours, kept under inert conditions.

Generally the irradiated nonwoven substrate is imbibed with the monomer solution immediately after the irradiation step. Generally when using E-beam the irradiated substrate is imbibed within an hour, preferably within ten minutes. Generally, when using gamma as a source, the substrate should be imbibed immediately after irradiation since irradiation residence time will be long. It has been observed that if the substrate is irradiated by ionizing radiation in the presence of the grafting monomers, the grafting yield is lower, extractables are higher, and the biofiltration performance of the grafted nonwoven substrate is inferior to that article prepared by the instant method.

In the imbibing step the nonwoven substrate is contacted with the imbibing solution containing one or more grafting monomers and in amounts previously described. Suitable methods of imbibing include, but are not limited to, a spray coating, flood coating, knife coating, Meyer bar coating, dip coating, and gravure coating.

The imbibing solution remains in contact with the nonwoven substrate for a time sufficient for the radical sites to initiate polymerization with the grafting monomers. When imbibed with a solution of monomers, grafting reactions are mostly completed after 12 hours exposure; generally about 90+ percent. As a result, the nonwoven substrate comprises grafted polymers and/or copolymers attached to the interstitial and outer surfaces of the nonwoven substrate.

The concentration of each grafting monomer in the imbibing solution may vary depending on a number of factors including, but not limited to, the grafting monomer or monomers in the aqueous imbibing solution or suspension, the extent of grafting desired, the reactivity of the grafting monomer(s), and the solubility of the monomers used. Typically, the total concentration of the monomers in the imbibing solution ranges from about 1 wt % to about 50 wt %, desirably, from about 5 wt % to about 40 wt %, and more desirably from about 15 wt % to about 30 wt % based on a total weight of the imbibing solution. It will be understood that some monomers, such as the quaternary amine grafting monomers have a high water solubility, while others, such as the oxy monomer have much lower solubility. In some embodiments the monomers, such as the oxy monomers are used in amounts in excess of the solubility limit, and an emulsion or dispersion results. In some embodiments, the weight of the grafting monomers of the imbibing solution is 0.5 to 5, preferably 1 to 3, times the weight of the nonwoven substrate.

The imbibing solution further comprises is an aqueous solution, dispersion or suspension of the grafting monomer(s). It has been found that the addition of a water soluble organic solvent to form a solvent blend deleteriously affects the grafting efficiency and the resulting properties of the grafted article and increases the total organic extractables. The imbibing solution preferably contains no organic solvents.

Once the nonwoven substrate has been imbibed for a desired period of time, the nonwoven substrate bearing grafted polymer groups may be optionally rinsed to remove residual monomer and/or dried.

In the optional rinsing step, the functionalized nonwoven substrate is washed or rinsed one or more times to remove any unreacted monomers, solvent or other reaction by-products. Typically, the functionalized substrate is washed or rinsed up to three times using a water rinse, an alcohol rinse, a combination of water and alcohol rinses, and/or a solvent rinse (e.g., acetone, methyl ethyl ketone, etc). When an alcohol rinse is used, the rinse may include one or more alcohols including, but not limited to, isopropanol, methanol, ethanol, or any other alcohol that is practical to use and an effective solvent for any residual monomer. In each rinse step, the functionalized substrate may pass through a rinse bath or a rinse spray. In some embodiments, the rinse may comprise an ionic buffer solution that would reduce swelling of the hydrogel, the amount of retained water, and also avoiding weakening the non-woven substrate during this rinse step.

In some preferred embodiments, the grafted nonwoven substrate is subjected to a water rinse step by contacting the grafted substrate with water at a temperature in excess of 120° C. for at least one hour. It has been discovered that such rinsing conditions increase the total water capacity of the grafted substrate at least 25% compared to the unrinsed substrate. Further, these rinse conditions reduce the TOC to less than 100 ppm. In some embodiments the TOC may be reduced to less than 25 ppm.

In the optional drying step, the functionalized substrate is dried to remove any rinse solution. Typically, the functionalized substrate is dried in oven having a relatively low oven temperature for a desired period of time (referred to herein as "oven dwell time"). Oven temperatures typically range from about 30° C. to about 120° C., while oven dwell times typically range from about 120 to about 600 seconds. Any conventional oven may be used in the optional drying step. It should also be noted that in other embodiments the drying step can proceed before the rinsing step to eliminate volatile components before extraction of non-grafted residue. Following the optional drying step, the dried functionalized substrate can be taken up in roll form to be stored for future use. Some residual water is beneficial for the stability of the hydrogel.

The grafted copolymer comprises polymer tendrils that are initiated from, and supported by, the nonwoven substrate, the polymer chains (tendrils) extending into the interstitial spaces of the nonwoven substrate. The grafted polymer chains have pendent quaternary ammonium groups and/or ligand groups, epoxy groups (which subsequently hydrolyze) and/or ether groups, and amide groups. In the presence of pure water the hydrogel reaches a state of maximum hydration and volume. As the copolymer tendrils are non-crosslinked and are free to move independently, the grafted nonwoven article may have a large flow response to very low quantities of stimulus.

In contrast to the instant non-crosslinked grafted hydrogel polymer, conventional hydrogels comprise individual polymer strands or tendrils that are crosslinked through multiple crosslinking sites. Due to the crosslinking the molecular weight of the polymer is infinite and the "gel" refers to the swollen polymer network, the properties of which are controlled through polymer concentration, polymer molecular weight and crosslinking density.

Depending on the degree of substitution of the nonwoven substrate and the weight of polymer grafted to the surface thereof, the hydrogel polymer can completely fill the interstitial spaces of the nonwoven substrate thereby providing a barrier which effectively blocks the flow of pure water through the functionalized nonwoven article resulting in the higher backpressure at a given flux rate (constant rate) or very low flux at a given pressure (constant pressure). It is believe that in pure water the positively charged quaternary ammonium groups electrostatically repulse one another causing maximum extension of the grafted polymer chains and consequently maximum hydration of the hydrogel.

When used in filtration, the hydrogel can reversibly expand and collapse in response to a very small amount of a "trigger" such as a salt, buffer, organic solvent, temperature, pH contaminate, or a biomolecule, consequently contracting allowing for higher flux at lower pressure through the hydrogel network. Surprisingly, the grafted hydrogel network doesn't lose its' filtration performance in a "triggered" state. In the absence of such a "trigger" the fully expanded hydrogel network can offer more resistance to water flux.

In the state of maximum hydration, the hydrogel is constrained only by the nonwoven substrate, most significantly in the x and y axes (coplanar with the nonwoven substrate) and less so on the z axis, normal to the plane of the nonwoven substrate. The gel may swell up to 800 percent or more on the z axis, but the x and y axes desirably swell less than 100%, more preferably less than 50%, constrained by the nonwoven substrate.

In the art of melt-blown non-woven webs conditions can be adjusted to maximize the resiliency in the z direction (normal to the plane of the nonwoven by (a) adjusting the die and collector for proper fiber lay-down (b) adjusting melt temp and air temp to prevent fibers from over-fusing and forming fiber-fiber bonds, (c) minimize asymmetry caused by the collector being too close in proximity to the die. It is preferred that nonwoven fibers are below the polymer melt temperature before impinging on the collector to reduce the degree of fiber-fiber links. Desirably, the nonwoven may expand maximally in "z" direction (normal to the plane of the nonwoven) to allow for expansion of the hydrogel. Point-bonding of the nonwoven substrate will restrict swelling in the z direction.

The hydrogel reversibly contracts and allows water to flow (flux) through the resulting interstices in the presence of dissolved species, such as neutral compounds, salts, buffers and negatively charged ions. It is believed the dissolved species such as dissolved ions more effectively charge-couple to the positively charged cationic in the graft polymer so that the electrostatic repulsion between the cationic groups are reduced and the hydrogel constricts or collapses. Alternatively the dissolved species may displace the hydration sphere of the water (and possible solvent) molecules with the result that the hydrogel collapses around the non-woven substrate. Therefore the article exhibits a stimulus-response hydrogel ("responsive hydrogel") that is discontinuous in nature—able to reversibly open and close the pores or interstices of the hydrogel.

The functionalized nonwoven substrates are particularly suited as filter media, such as the filter media found in water filtration devices. As the polymer is grafted to render it hydrophilic, the filter media is durable. In water filtration media, such as filter devices, the filter media may be cleaned or sanitized by contact or flushing with aqueous NaOH. The hydrophilic porous substrate described herein, can be contacted or flushed with NaOH and retain the hydrophilic properties as evidenced by the surface energy and wettability.

When used in a filtration application, one or more layers of the functionalized substrate may be used, each of which layers may have the same, or different average fiber size, void volume, degree of polymer grafting, monomer composition of grafted polymer, porosity, tensile strength and surface area. In some embodiments, each subsequent layer may have a smaller effective pore size or smaller average fiber size so that finer contaminants may be filtered. The grafted nonwoven substrate may be configured as planer or lenticular disks. In some embodiments the nonwoven substrate may be pleated. Pleated grafted nonwoven filter elements may be combined as multiple concentric pleated elements. The grafted nonwoven substrate may be wound spirally. Further, the grafted nonwoven substrate may be encapsulated with a porous web to provide support and aid in handling. In filtration applications, the nonwoven may be disposed either vertically, or horizontally.

When used in a filtration application, one or more layers of the graft functionalized substrate may be used, each of which layers may have the same, or different average void or pore size, void volume, degree of polymer grafting, monomer composition of grafted polymer, porosity, tensile strength and surface area. In some embodiments, each subsequent layer may have a smaller pore size or smaller average fiber size so that finer contaminants may be filtered. The grafted substrate may be configured as planer or lenticular disks. In some embodiments the nonwoven substrate may be pleated. Pleated grafted nonwoven filter elements may be combined as multiple concentric pleated elements. The grafted nonwoven substrate may be wound spirally. Further, the grafted substrate may be encapsulated with a porous web to provide support and aid in handling. In filtration applications, the porous grafted substrate may be disposed either vertically, or horizontally.

In some embodiments the functionalized porous substrate may be combined with conventional filter elements, such as microporous membranes. In particular, a filter comprising one or more layers of the instant functionalized nonwoven substrate can serve as a "prefilter" for removing contaminants and or protecting downstream processing, including additional downstream filters.

Further, one or more layers of the grafted nonwoven substrate may be combined with one of more layers of other microporous membranes. For example one to five layers of grafted substrate may be combined with ungrafted microporous layer(s). Each layer of the grafted substrate may be the same or different. In some embodiments the layers may be the same, or may differ in terms of the particular substrate, thickness of the substrate, polymer used therein, fiber size, porosity, void volume, loft, tensile strength, surface area, grafting weight or density, degree of polymer grafting, and/or monomer concentration in the grafting polymer.

Examples of useful commercial membrane include LifeAssure™ or SterAssure™ cast nylon microporous membranes available from CUNO Inc., Meriden, Conn. Useful microporous membranes are disclosed in U.S. Pat. Nos. 6,413,070, 6,513,666, 6,776,940 and 6,264,044 (Meyering et al.,), U.S. Pat. No. 5,006,247 (Dennison et al.), U.S. Pat. No. 3,876,738 (Marinaccio et al.), U.S. Pat. No. 4,707,265, (Barnes et al.), and U.S. Pat. No. 4,473,474 (Ostreicher et al.), each incorporated by reference. Useful graft polymer functionalized microporous membranes are disclosed in PCT/US2008/088106, (WO 2009/086347) and incorporated herein by reference.

The polymer functionalized porous substrate is ideally suited for depth filter application, which captures contaminants within the medium, i.e. between an upstream surface and a downstream surface of the medium. The article provides a high media packing density in an adsorptive depth-type filter module which provides improved filtration efficiency. The article further provides increased surface area for a given media mass in an adsorptive depth-type filter module which provides higher flow rate (flux). Typically there is a trade-off between achieving these desirable filter characteristics of high efficiency and high flux. However the present functionalized nonwoven substrate provides a depth-type filter module that has high efficiency without sacrificing flux.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

The following materials, solutions and test procedures were used to evaluate membranes of the present invention.

Materials

Methacrylamidopropyltrimethylaminochloride (MAPTAC) obtained from Aldrich Chemical Glycidyl methacrylate (GMA) obtained from Pfalz and Bauer, Waterbury, Conn.

N-vinyl pyrolidone (NVP) obtained from TCI, Portland, Oreg.

Isocyanatoethylmethacrylate agmatine (IEM-Ag) may be prepared as described in U.S. 2011-0033633

Dioctylsulfosuccinate sodium salt (DOS) obtained from Pfalz and Bauer, Waterbury, Conn.

Buffer Solution

A 1.0 liter buffer solution was prepared by adding 8.0 grams sodium chloride, 0.2 grams potassium_ chloride, 1.44 grams dibasic sodium phosphate, and 0.21 grams sodium phosphate monohydrate to a graduated cylinder followed by 800 milliliters of de-ionized (DI) water at 21° C. The pH was adjusted to a range of 6.8 to 7.4 using hydrochloric acid or sodium hydroxide solution as necessary, after which the volume was adjusted to 1.0 liter with de-ionized (DI) water.

Imbibing Solution

The imbibing solution was prepared in deionized (DI) water containing 26% total mixed monomers. For this example, all the NVP/GMA/MAPTAC monomer concentrations by weight were; 11%/6%/9% (MAPTAC raw material is 50/50 MAPTAC/water, 18% wt. if calculated as purchased). By mol, the NVP/GMA/MAPTAC concentrations were 0.10/0.04/0.04.

Yeast/Molasses Feedstock

Yeast aliquots were prepared by adding 65 grams of the yeast to 500 ml of the buffer solution described above in a 1.0 liter beaker. Using a Turrax (IKA T-18) high-shear mixer, the yeast solution was blended for 20 minutes at 22,000 rpm and then centrifuged for 5 minutes at 3000 rpm to create yeast supernatant. A total of 40 ml of the yeast supernatant was decanted into a clean 1.0 liter beaker with the addition of 2 grams of molasses and then diluted with buffer solution to 1.0 liter. The solution was stirred until uniform. Following these procedures, the average turbidity of the Yeast/Molasses (Y/M) feedstock solution was about 60 Nephelometric Turbidity Units (NTU). There can be large variations in turbidity following the above procedures due to lot to lot variations from the Brewers Yeast.

Filtration Test

A FILTER-TEC 2-pressure zone, dead-end filtration system and software, (Scilog, Inc., Middleton, Wis.) was used to conduct the filtration experiments. The filtration system was divided into two pressure zones for testing and measurement.

Pressure zone 1 (P1), retained four 47 mm diameter discs of grafted nonwoven substrates (described in the Examples below) retained in one stainless steel filter holder (part number 7022501, obtained from 3M Purification Inc.). Pressure zone 1 was the topmost or upstream layer in the filtration assembly, immediately adjacent the inlet fluid stream.

Pressure zone 2 (P2) retained a 0.2 micrometer LIFEASSURE PDA 020 membrane (obtained from 3M Company, St. Paul, Minn.). Pressure zone 2 was the bottom layer in the filtration assembly, immediately adjacent pressure zone 2.

The yeast/molasses feedstock was pumped at a constant flow rate of 8 mls/minute until a pressure of 172.4 kPa (25 psi) was reached in any one of the pressure zones.

Using the FILTER-TEC Scilog filtration equipment, two pressure zones were used. Pressure zone one (P1) monitored the grafted nonwoven substrate layer(s). Pressure zone two (P2) monitored the LIFEASSURE 0.2 micron sterilization grade filter. All the holders were connected in series which allowed for the independent monitoring of the two pressure zones. The Scilog equipment was set at a constant flow rate while the pressure and volume output data was automatically tabulated. The test procedure ended when a pressure of 172.4 kPa (25 psi) was reached for any of the pressure zones. The weight (volume) was recorded as throughput. Turbidity of the filtrate was also measured.

Autoclave Class VI TOC Testing Procedure

Four grams (dried weight) of the grafted polypropylene nonwoven sample was folded and placed in a 47 milliliter (16 ounce) jar filled with a 0.9% NaCl aqueous solution. The grafted sample was allowed to swell and equilibrate with the NaCl solution. The excess solution was emptied and 25 ml of a 0.9% NaCl aqueous solution was added and the jar was lightly capped. The sample was autoclaved at 121° C. for 1 hour. After the autoclave cycle, approximately 20 ml of liquid remained free of the gel and was decanted for TOC extract testing. A 0.2 μm syringe filter was flushed with 20 ml of DI water and the decanted autoclave extraction fluid was then filtered to remove any undissolved particles. The solution was automatically analyzed by a Shimadzu TOC-L instrument measuring NPOC mode (non-purgable organic compounds).

Preparation of Polypropylene Nonwoven Substrate

Example 1

A 30 cm by 43 cm sample of the melt-blown polypropylene microfiber (PP) nonwoven substrate described above (Effective Fiber Diameter of 4.3 micrometers, basis weight of 90 grams per square meter, solidity of 10%) was purged of air under a nitrogen atmosphere in a glove box and inserted into a ZIPLOC™ plastic bag and sealed. The sealed bag was then removed from the glove box and irradiated to a dose level of 40 kGy by passing it through an Energy Sciences, Inc. 'Electrocurtain' CB-300 electron beam in a single pass operation at a web speed of approximately 5.5 meters/minute (18-19 feet/min) and an accelerating voltage of 300 kV. After returning the sealed bag to the nitrogen atmosphere-controlled glove box, the irradiated nonwoven substrate was removed and placed inside a non-irradiated, nitrogen purged, ZIPLOC™ bag.

The freshly prepared nonwoven sample was imbibed with 100 grams of the nitrogen purged imbibing solution (described above) and the bag resealed after expelling most of the nitrogen. During this step the oxygen level within the glove box was generally maintained below 40 parts per million (ppm). The sample was maintained flat in the bag and evenly saturated for at least 12 hours.

The resulting grafted PP nonwoven substrate was removed from the bag and flushed 16 times with 600 ml of 14 mM saline water on a vacuum wash stand to eliminate incipient TOC present from the grafting procedure. The nonwoven was then air-dried overnight and weighed to determine the monomer add-on (graft ratio) and grafting yield. The Graft Yield is reported as the percent of monomer weight added to the weight of the nonwoven test piece. The following autoclave hot washing procedure was followed. Four grams of the dried grafted PP nonwoven was cut from the sheet, folded and placed in a 47 milliliter (16 ounce) jar filled with 400 ml of DI water after which the jar was lightly capped. The sample was autoclaved at 121° C. for 90 minutes. After the autoclave cycle, the sample was squeezed between nip rollers under flowing DI water (ambient temperature) several times. The hot wash cycle (with squeezing) was repeated again but with 400 ml of a 0.9% NaCl aqueous solution. The sample was air dried at ambient temperature without any edge restraints. The sample was then ready for the 121° C. Class VI autoclave testing procedure. (Drying is omitted if a "wet" autoclave test is desired.)

The Graft Yield data in Table 1 below includes about 8% retention of ambient moisture and is not subtracted. The Wet Autoclave TOC value did not decrease with additional autoclave washes. The 400 ml wash water of the first autoclave wash contained an average of 31 ppm TOC. The second 400 ml autoclave 0.9% saline wash water contained an average of 2.6 ppm TOC which is just above the noise level using our normal combustion tube of the Shimadzu TOC analyzer.

Example 2

A grafted nonwoven was prepared as in Example 1, except the NVP/GMA/MAPTAC monomer concentrations by weight were; 14%/6%/8.5% respectively. The irradiated nonwoven was imbibed with 104 grams of nitrogen purged imbibing solution (described above). The Autoclave Wash Procedure was followed except 30.5 cm by 43.2 cm (12 inch by 17 inch) sheets were autoclave washed in 2 liters of DI or saline water and were vacuum rinsed after each autoclave cycle and the sheets were allowed to equilibrate in a 1% saline solution. The sheets were allowed to dry without any edge restraints. Four gram specimens were then cut out from the sheets and tested for Dry Autoclave TOC, and Yeast/Molasses throughput. The results are shown in Table 1 below. The higher monomer ratio content of GMA improved the overall grafting yield. The Graft Yield data in Table 1 includes about 8% retention of ambient moisture and is not subtracted.

TABLE 1

| Example | Graft Yield (%) | Dry Autoclave TOC (ppm) | Y/M Throughput (ml) |
|---|---|---|---|
| 1 | 87% | 32.3 | 420 |
| 2 | 109% | 36.2 | 524 |

Examples 3-4

A grafted nonwoven was prepared as in Example 1 above except 105 gram quantities of imbibing solution were prepared in DI water, each containing 25.6 wt % total mixed monomers. The compositions of the imbibing solution are shown in Table 2 below. The imbibing solution used to prepare Example 3 contained only NVP, MAPTAC, and GMA monomers and water. The imbibing solution used to prepare Example 4 contained all 3 monomers, NVP, MAPTAC, and GMA in the same concentrations as Example 3, but with an additional 0.5 wt % of DOS.

The imbibing solutions were used for grafting the monomers onto a polypropylene nonwoven (Effective Fiber Diameter of 4 micrometers, basis weight of 90 grams per square meter, 10.2% solidity) following the procedure of Example 1. After grafting in a substantially oxygen-free environment for 16 hours, each of the samples was vacuum flushed 20 times with 600 mL of 14 mM NaCl solution on a vacuum wash stand. It was then immersed in 10 L of deionized water and boiled for 1 h. Finally, each sheet was vacuum flushed 20 times with 600 mL of 14 mM NaCl solution and dried in a convection oven at 30° C.

Graft yields, Dry Autoclave TOC's, and Yeast/Molasses throughputs of the two examples appear in Table 2 below. Example 3, containing NVP, MAPTAC, and GMA with no added surfactant, exhibited a graft yield >90% and the lowest TOC. Comparative Example C1, containing the same overall monomer concentration but no GMA, exhibited a significantly lower graft yield and a TOC test result that was over twice that of Example 3. These results demonstrate the value of GMA in both enhancing the graft yield and reducing the autoclave extractable organics of the media. Example 4, identical to Example 3 but with the added DOS surfactant, exhibited similar graft yield and throughput, but a somewhat higher TOC than 3. These results indicate that, with GMA in the composition to provide wetting of the polypropylene nonwoven, the inclusion of an additional surfactant is non-beneficial. The results also suggest that inclusion of a surfactant has a detrimental effect on extractables (TOC).

Comparative Example C1

A grafted nonwoven was prepared as in Examples 3-4, except the imbibing solution contained only NVP and MAPTAC monomers (no GMA), but at the same total monomer concentration. Because this solution contained no GMA, it was necessary to add 0.5 wt % of a surfactant, dioctylsulfosuccinate, sodium salt (DOS), to wet out the polypropylene nonwoven. Graft yields, Dry Autoclave TOC's, and Yeast/Molasses throughputs data are shown in Table 2 below.

and 4.7 g GMA) were made up where MAPTAC content was substituted with either 0, 10, 20 or 30% IEM-Ag as shown in Table 3 below (Examples 5-8). Following the procedure of Example 1, the nonwovens were irradiated at a dose of 50 kGy and imbibed with 105 g of solution each. The solutions were all suspensions and easily wetted into the PP nonwoven. Another set of examples (9-12) were made with 10, 20 or 30% substitution of NVP with IEM-Ag to leave the MAPTAC concentration unchanged. The grafted weight remained consistent and very high when IEM-Ag is substituted for MAPTAC but there was a downward trend when IEM-Ag was substituted for NVP. Lacking a charge, the 100% IEM-Ag substitution for MAPTAC did not swell significantly when wet.

Data from the air dried sheet weights are shown in Table 3 below. A 100% conversion would result in a sheet weight of 35.45 g (12.0 g from polypropylene nonwoven and 23.45 g from all monomers). The higher weight gains for the air dried sheets reflect additional weight from residual moisture. Replacement of NVP with IEM-Agm resulted in a real downward trend in graft yield. The wet TOC results (samples are not dried after washing) all averaged 23 ppm regardless of the IEM-Ag percentage. The 121° C. autoclave TOC (from dried) results compare well with results in Examples 1 and 2, addition of about 10-15 ppm to the wet TOC values. Yeast-Molasses results also compare favorably but decrease with decreasing MAPTAC content.

TABLE 2

| Example | NVP (%) | GMA (%) | MAPTAC (%) | DOS (%) | Graft Yield | Dry Autoclave TOC (ppm) | Y-M Throughput (mL) |
|---|---|---|---|---|---|---|---|
| 3 | 11.1 | 5.6 | 8.9 | 0 | 92 | 48 | 690 |
| 4 | 11.1 | 5.6 | 8.9 | 0.5 | 91 | 63 | 620 |
| C1 | 16.7 | 0 | 8.9 | 0.5 | 79 | 114 | 819 |

Example 5-12

Grafted nonwovens were prepared as in Examples 3-4, except imbibing solutions (11.7 g NVP, 7.05 g MAPTAC

TABLE 3

| Example | NVP (%) | GMA (%) | MAPTAC (%) | IEM-Ag (%) | Grafted weight (g) | Dry Autoclave TOC (ppm) | Y-M throughput (mL) |
|---|---|---|---|---|---|---|---|
| 5 | 11.1 | 4.5 | 6.7 | 0 | 37.3 | Not reported | Not reported |
| 6 | 11.1 | 4.5 | 6.0 | 0.70 | 37.5 | 39.6 | 877 |
| 7C | 11.1 | 4.5 | 5.3 | 1.4 | 37.2 | 32.2 | 758 |
| 8 | 11.1 | 4.5 | 4.6 | 2.1 | 37.1 | 31.8 | 707 |
| 9E | 11.1 | 4.5 | 0 | 6.7 | 35.1 | Not reported | Not reported |
| 10 | 10.0 | 4.5 | 6.7 | 1.1 | 36.5 | Not reported | Not reported |
| 11 | 8.9 | 4.5 | 6.7 | 2.2 | 35.7 | Not reported | Not reported |
| 12 | 7.8 | 4.5 | 6.7 | 3.3 | 33.4 | Not reported | Not reported |

Examples 13-19

Grafted nonwovens were prepared as in Example 1, except different acrylate monomers were used in place of the GMA. Following the procedure of Example 1, seven 30 cm×43 cm sheets of polypropylene nonwoven (Effective Fiber Diameter of 4.1 micrometers, basis weight of 90 grams per square meter) weighing about 12 g each, were irradiated and imbibed with 105 g aliquots of grafting solutions consisting of 11.7 g NVP, 7.05 g of MAPTAC and either 4.7 or 5.7 g of an acrylate grafting monomer as specified in Table 4 below. After the general washing procedure, the air dried sheets were weighed. Following the autoclave hot washing procedure, the TOC was also measured and is reported in Table 4. The degree of grafting uniformity and wetting are also described in the notes column of Table 4.

TABLE 4

| Example | Acrylate monomer | Monomer weight in solution (g) | Grafted Sheet Weight (g) | Wet Autoclave TOC (ppm) | Dry Autoclave TOC (ppm) | Notes |
|---|---|---|---|---|---|---|
| 13 | isobornyl methacrylate | 4.7 | 38.5 | — | — | Grafting concentrated, large patch low grafting, very poor uniformity |
| 14 | isopropyl methacrylate | 5.7 | 33.8 | 29.3 | 69.6 | Thick and thin grafting, areas dewetted, very poor grafting uniformity |
| 15 | n-propyl methacrylate | 4.7 | 35.6 | 22.5 | 64.2 | Thick and thin grafting areas but improved over 7A and B, poor grafting uniformity |
| 16 | 2-hydroxypropyl methacrylate | 5.7 | 36.7 | 30.5 | 46.5 | Poor wetting of PP nonwoven, slower to penetrate bulk, grafting uniform |
| 17 | 2-methoxyethyl methacrylate | 4.7 | 37.0 | 34.8 | 77.0 | Good wetting of PP, even grafting, high swell volume |
| 18 | 2-ethyloxyethyl methacrylate | 4.7 | 37.3 | 68.0 | 78.1 | Good wetting of PP, even grafting, very high swell volume |
| 19 | glycidyl methacrylate | 4.7 | 37.5 | 30.6 | 42.7 | Good wetting of PP, even grafting, loses ability to wet PP when total monomer is below 22%, low TOC after autoclave |

The samples are dried at ambient conditions and contain about 6% moisture for determining Sheet Graft Weight.

Example 20

A 25.4 cm×30 cm piece of polypropylene nonwoven (Effective Fiber Diameter 5.9, 147 grams/sq meter weighing 12 grams) was grafted with the same imbibing solution as in Example 5, following the procedure of Example 1. The grafted nonwoven was washed and air dried. It had a dry weight of 32.5 grams.

Examples 21-23

Grafted nonwovens were prepared as in Example 5, except different polypropylene nonwoven substrates were used having Effective Fiber Diameters and basis weights as shown in Table 5 below. The imbibing solution composition for Examples 21 and 23 was 8.8 g NVP, 5.3 g MAPTAC and 3.5 g GMA in a 79 g aqueous solution. The imbibing solution composition for Example 22 was 15.6 g NVP, 9.4 g MAPTAC and 4.6 g GMA in a 140 g aqueous solution. The samples were irradiated to a dose of 50 kGy, following the procedure of Example 1. There was some excess liquid after imbibing due to the fiber thickness but all of it was absorbed during the grafting reaction. The grafted nonwovens were washed and air dried. The Graft yields, Wet and Dry Autoclave TOC's, and Yeast/Molasses throughputs data are shown in Table 5 below. "Final NTU" refers to the nephelometric turbidity after the yeast-molasses throughput.

TABLE 5

| Example | EFD (μm) | Solidity (%) | Basis Weight (gsm) | Sample Weight (g) | Imbibing solution (mL) | Graft Yield (%) | Wet TOC (ppm) | Dry TOC (ppm) | Final NTU | Y-M (mL) |
|---|---|---|---|---|---|---|---|---|---|---|
| 20 | 5.9 | 14.8 | 147 | 12 | 105 | 87.6 | 22 | 47 | — | 847 |
| 21 | 10.9 | 10.3 | 60 | 9.1 | 79 | 91.0 | 12.3 | 15.1 | 7.87 | 246 |
| 22 | 7.1 | 12.6 | 121 | 16.2 | 140 | 94.3 | 22.5 | 37.1 | 8.84 | 505 |
| 23 | 5.6 | 15.7 | 60 | 8.8 | 79 | 87.5 | 15.9 | 39.9 | 6.53 | 437 |

Examples 24-30

Grafted nonwovens were prepared as in Example 5, except different electron beam doses were used. Following the procedure of Example 1, seven 30 cm×43 cm sheets of polypropylene nonwoven (Effective Fiber Diameter of 4.5 micrometers, basis weight of 90 grams per square meter, 9.2% Solidity) weighing about 13 g each, were irradiated and imbibed with 105 g aliquots of the grafting solution used in Example 5. The glove box procedure of Example 1 was followed. For each sample, the dose was varied in the following amounts; 30, 40, 50, 60, 80, 100 and 120 kGy. The Graft yields, Dry Autoclave TOC, and Yeast/Molasses throughputs data are shown in Table 6 below.

TABLE 6

| Example | Dose (kGy) | Grafted Weight (g) | Graft Yield (%) | Dry Autoclave TOC (ppm) | Y-M (mL) | Final NTU |
|---|---|---|---|---|---|---|
| 24 | 30 | 36.3 | 98.9 | 30.6 | 624 | 4.09 |
| 25 | 40 | 37.2 | 103 | 36.0 | 794 | 3.36 |
| 26 | 50 | 37.6 | 104 | 32.0 | 670 | 3.59 |
| 27 | 60 | 38.0 | 106 | 32.5 | 583 | 6.04 |
| 28 | 80 | 37.8 | 105 | 35.3 | 653 | 3.29 |
| 29 | 100 | 38.3 | 107 | 45.6 | 644 | 3.81 |
| 30 | 120 | 37.9 | 106 | 40.2 | 590 | 3.68 |

The invention claimed is:

1. A copolymer grafted article comprising:
    a) a nonwoven substrate, and
    b) a grafted copolymer comprising interpolymerized monomer units of
        a) 10 to 50 parts by weight of a cationic nitrogen-containing ligand monomer, wherein the cationic nitrogen-containing ligand monomer is selected from the group consisting of quaternary ammonium-containing ligand monomers, guanidinyl-containing ligand monomers, and combinations thereof;
        b) 10 to 80 parts by weight of an amide monomer;
        c) 10 to 40 parts by weight of an oxy monomer selected from the group consisting of epoxy functional monomer units, alkyl ether functional monomer units, and combinations thereof; and
        d) 0 to 30 parts by weight of the poly(alkylene oxide) monomer, wherein the sum of a to d is 100 parts by weight.

2. The copolymer grafted article of claim 1 wherein the cationic nitrogen-containing ligand monomer is of the formula:

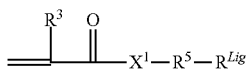

where $X^1$ is —O— or —NR$^3$—, where $R^3$ is H or $C_1$-$C_4$ alkyl-; $R^5$ is an alkylene, and $R^{Lig}$ is a quaternary ammonium ligand group or a guanidinyl-containing ligand group.

3. The copolymer grafted article of claim 1 wherein the quaternary ammonium monomer is of the formula:

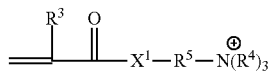

where $X^1$ is —O— or —NR$^3$—, where $R^3$ is H or $C_1$-$C_4$ alkyl-; and $R^5$ is an alkylene, each $R^4$ is independently hydrogen, alkyl, or aryl.

4. The copolymer grafted article of claim 1 wherein the guanidinyl-containing ligand monomer is of the formula:

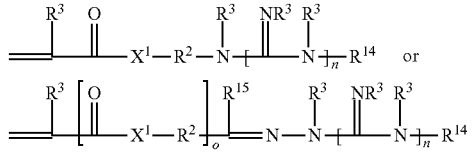

wherein
$R^2$ is a (hetero)hydrocarbyl group;
each $R^3$ is independently H or hydrocarbyl
$R^{14}$ is H, $C_1$-$C_4$ alkyl or —N($R^3$)$_2$;
$R^{15}$ is H or hydrocarbyl;
$X^1$ is —O— or —NR$^3$—,
o is 0 or 1, and
n is 1 or 2.

5. The copolymer grafted article of claim 4 wherein $R^2$ is a divalent (hetero)hydrocarbyl group having 1 to 20 carbon atoms.

6. The copolymer grafted article of claim 4 wherein each $R^3$ is independently H or a $C_1$-$C_4$ alkyl group.

7. The copolymer grafted article of claim 4 wherein $R^{15}$ is H, a $C_1$-$C_4$ alkyl group, or an aryl group.

8. The copolymer grafted article of claim 1 having interpolymerized oxy monomer units of the formula:

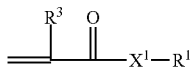

wherein:
$R^3$ is —H or $C_1$-$C_4$ alkyl;
$X^1$ is —$NR^3$— or —O— ; and
$R^1$ is an epoxy-functional or ether-functional hydrocarbyl group.

9. The copolymer grafted article of claim 1 having interpolymerized oxy monomer units of the formula:

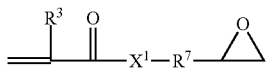

wherein:
$R^7$ is a (hetero)hydrocarbyl group;
$R^3$ is —H or $C_1$-$C_4$ alkyl; and
$X^1$ is —$NR^3$— or —O—.

10. The copolymer grafted article of claim 9 wherein $R^7$ is a hydrocarbyl group.

11. The copolymer grafted article of claim 9 wherein $R^7$ is a $C_1$-$C_6$ alkylene group.

12. The copolymer grafted article of claim 1 having interpolymerized amide monomer units of the formula:

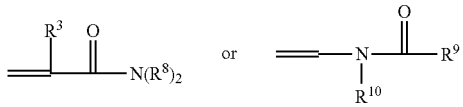

where
$R^3$ is —H or $C_1$-$C_4$ alkyl;
Each $R^8$ is an H, an alkyl or an aryl group,
$R^9$ and $R^{10}$ are alkyl groups, or may be taken together to form a 5 or 6-membered ring.

13. The copolymer grafted article of claim 1 wherein the nonwoven substrate has a tensile strength of at least 4.0 newtons prior to grafting.

14. The copolymer grafted article of claim 1 wherein the nonwoven substrate has a surface area of 15 to 50 m² per square meter of nonwoven substrate.

15. The copolymer grafted article of claim 1 wherein the nonwoven substrate has a mean pore size of 1-40 microns according to ASTM F 316-03.

16. The copolymer grafted article of claim 1 wherein the nonwoven substrates have a solidity of less than 20%.

17. The copolymer grafted article of claim 1 wherein the nonwoven substrate is a spunlaid, hydroentangled or a meltblown nonwoven substrate.

18. The copolymer grafted article of claim 1 wherein the weight of the grafted polymer is 0.5 to 3 times the weight of the nonwoven substrate.

19. The copolymer grafted article of claim 1 wherein the nonwoven substrate is prepared from a hydrophobic thermoplastic polyolefin.

20. The copolymer grafted article of claim 1 wherein the graft copolymer is of the formula
-$(M^{NR4+})_a$ -$(M^{Oxy})_b$ -$(M^{Amide})_c$ ,wherein -$(M^{NR4+})_a$ -represent the residue of the grafted cationic nitrogen-containing ligand monomer having a polymerized monomer units where a is at least 1,
-$(M^{Oxy})_b$ represents the polymerized oxy monomer units having b polymerized monomer units, where b is at least one;
$(M^{Amide})_c$ represents the polymerized amide monomer having c polymerized monomer units, where c is at least one.

21. The copolymer grafted article of claim 20 wherein the copolymer is a random copolymer.

22. The copolymer grafted article of claim 20 wherein the copolymer is a block copolymer.

23. The copolymer grafted article of claim 1 wherein the copolymer is uncrosslinked.

24. The copolymer grafted article of claim 1 wherein the nonwoven substrate comprises a single fiber type.

25. The copolymer grafted article of claim 1 wherein the oxy monomer is selected from the group consisting of epoxy functional monomer units, alkyl ether functional (meth)acrylate monomer units, alkyl ether functional (meth)acrylamide monomer units, and combinations thereof.

26. The copolymer grafted article of claim 1 wherein the nonwoven substrate has an effective fiber diameter of about 3 to about 10 micrometers.

27. The copolymer grafted article of claim 26 wherein the nonwoven substrate has an effective fiber diameter of from about 4 to 10 micrometers.

28. A copolymer grafted article comprising:
a) a nonwoven substrate, and
b) a grafted copolymer comprising interpolymerized monomer units of
a) 10 to 50 parts by weight of a cationic nitrogen-containing ligand monomer, wherein the cationic nitrogen-containing ligand monomer is selected from the group consisting of quaternary ammonium-containing ligand monomers, guanidinyl-containing ligand monomers, and combinations thereof;
b) 10 to 80 parts by weight of an amide monomer;
c) 10 to 40 parts by weight of an oxy monomer selected from the group consisting of epoxy functional monomer units, alkyl ether functional monomer units, and combinations thereof; and
d) 0 to 30 parts by weight of the poly(alkylene oxide) monomer, wherein the sum of a to d is 100 parts by weight,
wherein the cationic nitrogen-containing ligand monomer is selected from the group consisting of agmatine containing ligands, guanidine containing ligands, biguanide containing ligands, and combinations thereof.

29. The copolymer grafted article of claim 28 wherein the agmatine containing ligand is an isocyanatoethylmethacrylate-agmatine adduct.

30. A process for preparing the polymer grafted article of claim 1 comprising:
a) providing a nonwoven substrate;
b) irradiation the substrate with ionizing radiation to provide incipient free radicals on the surface thereof;
c) imbibing the irradiated substrate with an aqueous monomer mixture comprising:
a. 10 to 50 parts by weight of the cationic nitrogen-containing ligand monomer;
b. 10 to 80 parts by weight of the amide monomer;
c. 10 to 40 parts by weight of the oxy monomer; and
wherein the sum of a to c is 100 parts by weight.
d.) optionally rinsing the grafted substrate.

31. The process of claim 30 wherein the aqueous monomer mixture comprises 1 to 50 wt. % in water.

32. The process of claim 30 wherein the aqueous monomer mixture comprises no organic solvents or surfactants.

33. The process of claim 30 wherein the rinsing step comprises contacting the grafted substrate with water at a temperature in excess of 120° C. for at least one hour.

34. The process of claim 30 wherein the nonwoven substrate is a polyolefin.

35. The process of claim 30 wherein the substrate is irradiated with electron beam at a dose of 1 to 100 kGys of e-beam radiation.

36. The process of claim 30 wherein the oxy monomer has an aqueous solubility of 15-25 g/L.

37. The process of claim 30 wherein the step of irradiation occurs in a non-ionizable container.

38. The method of claim 30 wherein the imbibing solution comprises no additional polyethylenically unsaturated monomers.

39. The method of claim 30 wherein exposure to e-beam energy generates free radical sites on the surfaces of the nonwoven substrate, and initiating graft polymerization of said monomers.

40. The method of claim 30 wherein the weight of the grafting monomers of the imbibing solution is 0.5 to 3 times the weight of the nonwoven substrate.

41. A copolymer grafted article comprising:
a) a nonwoven substrate, and
b) a grafted copolymer comprising interpolymerized monomer units of
  (i) 10 to 50 parts by weight of methacrylamidopropyltrimethylammonium chloride (MAPTAC);
  (ii) 10 to 80 parts by weight of N-vinyl pyrrolidone (NVP); and
  (iii) 10-40 parts by weight of glycidyl methacrylate (GMA)
wherein the sum of (i) to (iii) is 100 parts by weight.

* * * * *

UNITED STATES PATENT AND TRADEMARK OFFICE
CERTIFICATE OF CORRECTION

| | | |
|---|---|---|
| PATENT NO. | : 9,821,276 B2 | Page 1 of 1 |
| APPLICATION NO. | : 14/396764 | |
| DATED | : November 21, 2017 | |
| INVENTOR(S) | : Michael Berrigan | |

It is certified that error appears in the above-identified patent and that said Letters Patent is hereby corrected as shown below:

In the Specification

Column 3,
Line 53, delete "2-(2'-phenoxyethoxyl)" and insert -- 2-(2'-phenoxyethoxy) --, therefor.

Column 10,
Line 32, delete "$R^{1o}$" and insert -- $R^{10}$ --, therefor.

In the Claims

Column 26,
Line 13, in Claim 2, delete "$R^{Lig}$is" and insert -- $R^{Lig}$ is --, therefor.
Line 55, in Claim 4, delete "hydrocarbyl" and insert -- hydrocarbyl; --, therefor.

Column 27,
Line 11, in Claim 8, delete "—O— ;" and insert -- —O—; --, therefor.
Line 43, in Claim 12, delete "$R^{10}$are" and insert -- $R^{10}$ are --, therefor.
Line 67, in Claim 20, delete "-$(M^{NR4+})_a$-$(M^{Oxy})_b$ -$(M^{Amide})_c$ ,wherein" and insert -- -$(M^{NR4+})_a$-$(M^{Oxy})_b$-$(M^{Amide})_c$, wherein --, therefor.

Column 28,
Line 4, in Claim 20, delete "-$(M^{Oxy})_b$" and insert -- -$(M^{Oxy})_b$ --, therefor.
Line 7, in Claim 20, delete "$(M^{Amide})_c$" and insert -- -$(M^{Amide})_c$ --, therefor.

Signed and Sealed this
Eighth Day of May, 2018

Andrei Iancu
*Director of the United States Patent and Trademark Office*